United States Patent
Townsend et al.

(10) Patent No.: US 8,241,813 B2
(45) Date of Patent: Aug. 14, 2012

(54) FUEL CELL ARRANGEMENT

(75) Inventors: James M. Townsend, Ashbourne (GB);
Michele Bozzolo, Derby (GB); Gerard D. Agnew, Derby (GB)

(73) Assignee: Rolls-Royce PLC, London (GB)

( * ) Notice: Subject to any disclaimer, the term of this patent is extended or adjusted under 35 U.S.C. 154(b) by 1329 days.

(21) Appl. No.: 11/886,058

(22) PCT Filed: Mar. 13, 2006

(86) PCT No.: PCT/GB2006/000860
§ 371 (c)(1),
(2), (4) Date: Sep. 11, 2007

(87) PCT Pub. No.: WO2006/106288
PCT Pub. Date: Oct. 12, 2006

(65) Prior Publication Data
US 2009/0042082 A1 Feb. 12, 2009

(30) Foreign Application Priority Data
Apr. 5, 2005 (GB) .................................. 0506866.3

(51) Int. Cl.
*H01M 2/02* (2006.01)
(52) U.S. Cl. ......... 429/479; 429/488; 429/535; 429/443
(58) Field of Classification Search .................. 429/479, 429/488, 535, 443
See application file for complete search history.

(56) References Cited

U.S. PATENT DOCUMENTS

| 5,366,819 | A | 11/1994 | Hartvigsen et al. |
| 5,914,200 | A | 6/1999 | Schabert et al. |
| 6,444,342 | B1 | 9/2002 | Doshi et al. |
| 2003/0012997 | A1 | 1/2003 | Hsu |
| 2003/0054209 | A1 | 3/2003 | Gillett et al. |
| 2003/0054210 | A1 | 3/2003 | Gillett et al. |
| 2004/0086765 | A1 | 5/2004 | Florence et al. |
| 2004/0096714 | A1 | 5/2004 | Bette et al. |

FOREIGN PATENT DOCUMENTS

| EP | 1 427 045 A2 | 6/2004 |
| JP | A-61-161667 | 7/1986 |
| JP | A-61-216268 | 9/1986 |
| JP | A-63-086270 | 4/1988 |
| JP | A-2003-045455 | 2/2003 |
| JP | A 2004-206922 | 7/2004 |
| JP | A-2008-504825 | 2/2008 |

*Primary Examiner* — Jane Rhee
(74) *Attorney, Agent, or Firm* — Oliff & Berridge, PLC (57) ABSTRACT

A fuel cell arrangement comprises at least one fuel cell module, each fuel cell module comprises a plurality of fuel cells. Each fuel cell module is hollow and defines a chamber. Each fuel cell module is arranged within an inner vessel and the inner vessel is arranged within an outer pressure vessel. Means to supply oxidant is arranged to supply oxidant to the space within the inner vessel so as to supply oxidant to the cathode electrodes. Means to supply fuel is arranged to supply fuel to the chamber in each fuel cell module so to supply fuel to the anode electrodes. The outer pressure vessel is protected from the high temperature environment of the fuel cells by the inner vessel. The outer pressure vessel forms the main pressure containment of the arrangement and operates at a lower temperature and operates with a greater safety margin than a single pressure vessel arrangement.

46 Claims, 8 Drawing Sheets

FUEL CELL ARRANGEMENT

The present invention relates to a fuel cell arrangement and in particular to a solid oxide fuel cell arrangement.

It is known that a fuel cell arrangement comprises one, or more, fuel cell modules, each fuel cell module comprises a plurality of fuel cells arranged within a housing and each housing is arranged within a pressure vessel. Conventionally the pressure vessel has internal insulation and/or cooling fluid using passages within the pressure vessel to maintain the temperature of the pressure vessel at a sufficiently low temperature to guarantee the integrity of the pressure vessel. In the case of solid oxide fuel cells operating at higher temperatures, for example 700° C. to 1000° C., the thermal management of the heat flux to the pressure vessel is difficult.

The conventional arrangement suffers from problems. The maintaining of a uniform thermal gradient in the pressure vessel is compromised by the cooling fluid passages producing thermal gradients by design and this may result in the loss of parts of the insulation in service leading to local hot spots in the pressure vessel. These local hot spots cause local stress concentrations in the pressure vessel due to differential thermal expansion and thereby reduce the life of the pressure vessel. Internal insulation gives rise to condensation, at some zone within the insulation, which may promote the spalling off of parts of the internal insulation in service leading to local hot spots in the pressure vessel. The condensation may also lead to accelerated corrosion at the pressure vessel/internal insulation interface. In contrast, local failure of external insulation is failsafe because it would result in cool spots rather than hot spots. Accelerated corrosion of the pressure vessel may occur at the interface between the insulation and the pressure vessel, to an extent dependent on the material of the pressure vessel, and inspection of the pressure vessel for corrosion is restricted by the insulation. Cooling of the pressure vessel increases the system heat loss, which may reduce the efficiency of the electrical system.

There is a difficulty in providing a pressure vessel for fuel cell modules, which provides the required integrity and affordability considering the combination of pressure and temperature and the need to cover all the operating conditions of the fuel cell arrangement.

Accordingly the present invention seeks to provide a novel fuel cell arrangement, which reduces, preferably overcomes the above-mentioned problems.

Accordingly the present invention provides a fuel cell arrangement comprising at least one fuel cell module, each fuel cell module comprises a plurality of fuel cells, each fuel cell comprises an anode electrode, a cathode electrode and an electrolyte, the at least one fuel cell module is hollow and defines a chamber, the at least one fuel cell module is arranged within at least one inner vessel and the at least one inner vessel is arranged within an outer pressure vessel, means to supply oxidant to the cathode electrodes, means to supply fuel to the anode electrodes, the means to supply oxidant is arranged to supply oxidant to the space within the inner vessel, the space within the inner vessel is arranged to supply oxidant to the cathode electrodes, the means to supply fuel is arranged to supply fuel to the chamber in the at least one fuel cell module and the chamber in the at least one fuel cell module is arranged to supply fuel to the anode electrodes of the at least one fuel cell module.

Preferably the means to supply oxidant to the cathode electrodes is arranged such that the pressure between the outer pressure vessel and the at least one inner vessel is greater than the pressure in the at least one inner vessel such that the at least one inner vessel is subjected to a compressive load.

Preferably there are means to remove exhaust gases from the fuel cells.

Preferably the means to supply oxidant supplies oxidant into a space between the at least one inner vessel and the outer pressure vessel.

Preferably the means to supply oxidant supplies the oxidant from the space between the at least one inner vessel and the outer pressure vessel into the at least one inner vessel.

Preferably the means to supply oxidant supplies the oxidant from the space between the at least one inner vessel and the outer pressure vessel to a space between the inner vessel and the at least one fuel cell module.

Preferably the means to supply oxidant supplies the oxidant from the space between the at least one inner vessel and the outer pressure vessel into the at least one inner vessel through at least one ejector, pump, fan, blower or turbomachine.

Alternatively the means to supply oxidant supplies a first portion of the oxidant through at least one restrictor to the space between the at least one inner vessel and the outer pressure vessel, the means to supply oxidant supplies a second portion of the oxidant into the at least one inner vessel.

Preferably the means to supply oxidant supplies the second portion of the oxidant into the space between the inner vessel and the at least one fuel cell module.

Preferably the means to supply oxidant supplies the second portion of the oxidant into the at least inner vessel through at least one ejector, pump, fan, blower or turbomachine.

Preferably the means to supply oxidant supplies the first portion of oxidant from the space between the outer pressure vessel and the at least one inner vessel into the at least one inner vessel through at least one restrictor.

Preferably the means to supply oxidant supplies the first portion of oxidant from the space between the outer pressure vessel and the at least one inner vessel into the at least one inner vessel through the at least one restrictor and the at least one ejector, pump, fan, blower or turbomachine.

Preferably there are means to supply unused oxidant to the space between the at least one inner vessel and the at least one fuel cell module.

Preferably the means to supply unused oxidant to the space between the at least one inner vessel and the at least one fuel cell module comprises the at least one ejector, pump, fan, blower or turbomachine.

Preferably the means to supply unused oxidant to the space between the at least one inner vessel and the at least one fuel cell module comprises at least one combustor, means to supply unused oxidant to the at least one combustor and means to supply unused fuel to the at least one combustor and means to supply the products of the at least one combustor to the at least one ejector, pump, fan, blower or turbomachine.

Preferably the at least one inner vessel is tubular and the outer pressure vessel is tubular.

Preferably insulation is provided on the inner surface of the at least one inner vessel. Preferably a space is provided between the insulation and the inner surface of the at least one inner vessel. Insulation may be provided on the outer surface of the at least one inner vessel. Preferably a space is provided between the insulation and the outer surface of the at least one inner vessel. Insulation may be provided on the outer surface of the outer pressure vessel.

Preferably a plurality of modules are arranged within the at least one inner vessel.

Preferably there is a plurality of inner vessels, alternatively there is a single inner vessel.

Preferably a plurality of modules are arranged within each inner vessel.

Preferably the modules are arranged around a central axis.

Preferably the means to supply oxidant comprises a pump or a compressor.

Preferably the compressor is connected to a turbine.

Preferably a portion of the unused oxidant is supplied to the turbine to drive the turbine.

Preferably a first pressure sensor is arranged to measure the pressure in the space between the at least one inner vessel and the outer pressure vessel, a second pressure sensor is arranged to measure the pressure in the space between the at least one inner vessel and the at least one fuel cell module and a monitor is arranged to compare the pressure measured by the first pressure sensor and the pressure measured by the second pressure sensor to determine if there is an overpressure due to component malfunction or burning of fuel in the fuel cell module.

Preferably the at least one ejector, pump, fan, blower or turbomachine is arranged such that it extends radially with respect to the axes of the at least one inner vessel with the inlet of the at least one ejector, pump, fan, blower or turbomachine arranged at the radially inner end and the exhaust of the at least one ejector, pump, fan, blower or turbomachine arranged at the radially outer end.

The at least one ejector, pump, fan, blower or turbomachine may be arranged such that it extends axially with respect to the axes of the of at least one inner vessel with the inlet of the at least one ejector pump, fan, blower or turbomachine arranged at one axial end of the inner vessel and the exhaust of the at least one ejector, pump, fan, blower or turbomachine at a central region of the inner vessel.

The at least one inner vessel defines a space with a wall member secured to the at least one inner vessel, the means to supply oxidant supplies oxidant into the space between the at least one inner vessel and the wall member.

The means to supply oxidant may supply oxidant from the space between the at least one inner vessel and the wall member to a space within the at least one inner vessel.

The means to supply oxidant may supply oxidant from the space between the at least one inner vessel and the wall member to the space between the at least one inner vessel and the outer pressure vessel.

The means to supply oxidant may supply the oxidant from the space between the at least one inner vessel and the wall member to the space within the at least one inner vessel through the at least one ejector, pump, fan, blower or turbomachine.

The means to supply oxidant to the space within the at least one inner vessel may supply the oxidant through at least one ejector, pump, fan, blower or turbomachine to a space between the at least one inner vessel and the at least one fuel cell module.

The at least one ejector, pump, fan, blower or turbomachine may supply unused oxidant from the at least one fuel cell module to the space between the at least one inner vessel and the at least one fuel cell module.

There may be means to supply unused oxidant from the at least one fuel cell module to at least one combustor, means to supply unused fuel from the at least one fuel cell module to the at least one combustor, and means to supply the products of at least one combustor to the at least one ejector, pump, fan, blower or turbomachine.

Preferably the at least one inner vessel is provided with a plurality of devices, which allow radial expansion and contraction of the at least one end of the at least one inner vessel.

Preferably the devices are arranged on both ends of the at least one inner vessel.

Preferably each device comprises a corrugated elongate member which has longitudinally spaced apart troughs and longitudinally spaced apart peaks, the corrugated elongate member is secured at its longitudinally spaced troughs to the at least one end of the inner vessel, the corrugated elongate member is secured at its longitudinally spaced peaks to an elongate member, the elongate member is U-shaped in cross-section and the corrugated elongate member is secured to the elongate member to the surface between the limbs of the U-shaped elongate member.

Preferably each device extends radially relative to the axis of the at least one inner vessel and the devices are angularly spaced apart on the at least one end of the at least one inner vessel.

Preferably the fuel cells are solid oxide fuel cells.

The present invention will be more fully described by way of example with reference to the accompanying drawings in which:—

Figure 1:
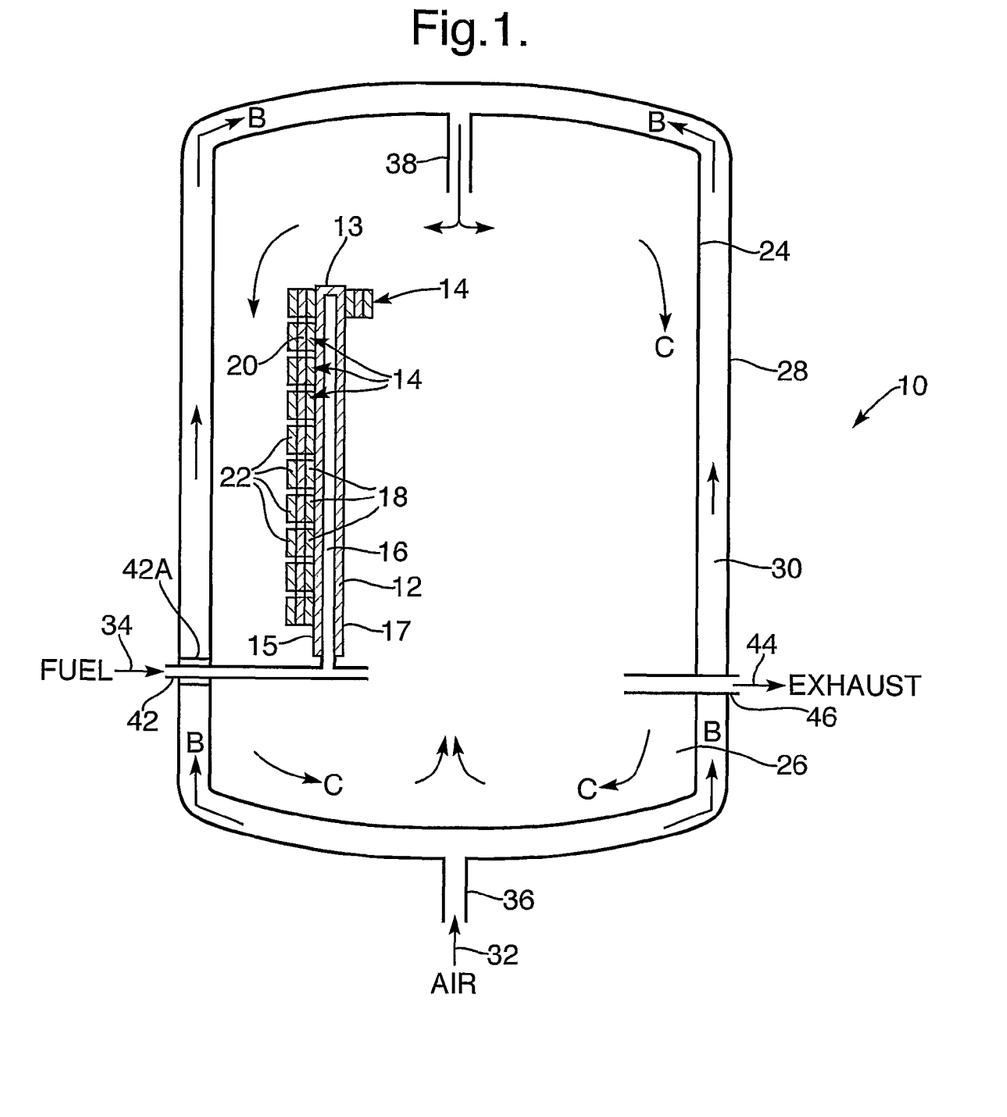
FIG. 1 is a longitudinal cross-sectional view through a fuel cell arrangement according to the present invention.
Figure 2:
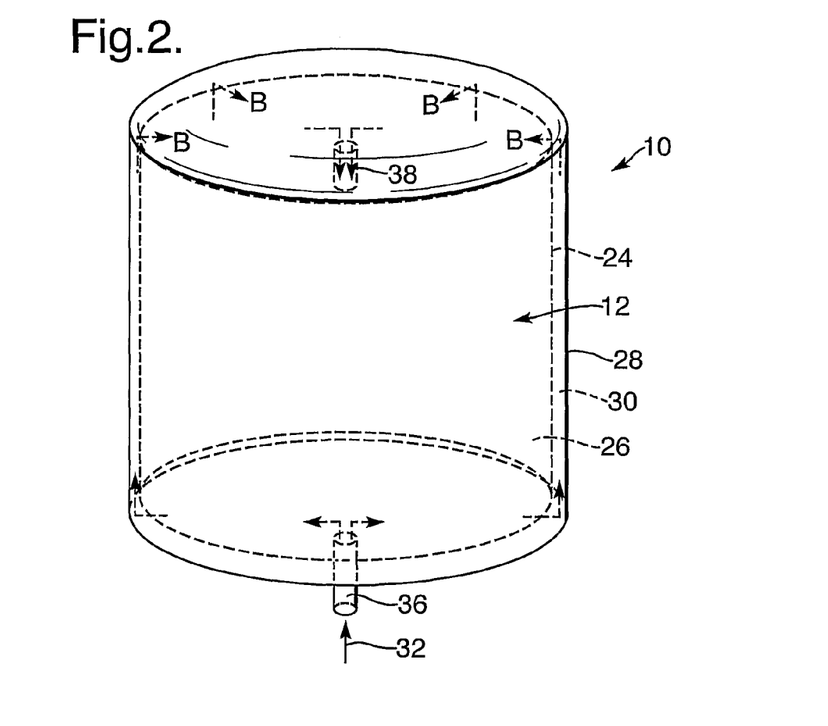
FIG. 2 is an isometric view of the fuel cell arrangement shown in FIG. 1.
Figure 3:
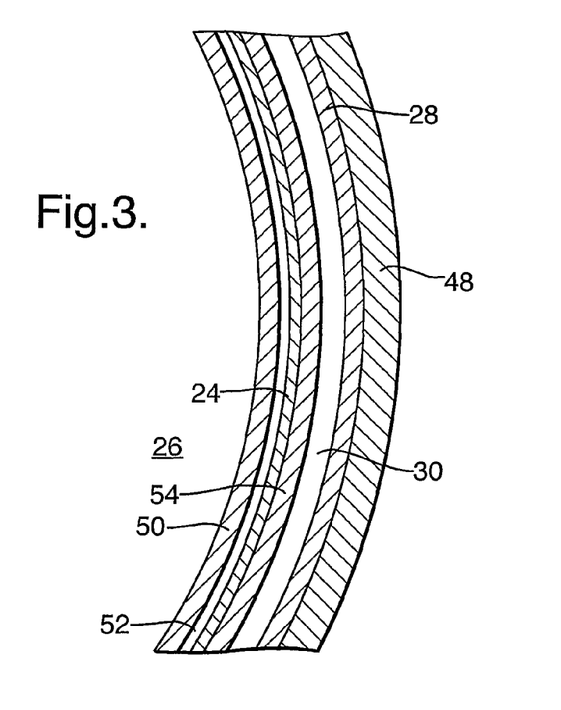
FIG. 3 is an enlarged cross-sectional view along line A-A through the fuel cell arrangement in FIG. 1.
Figure 7:
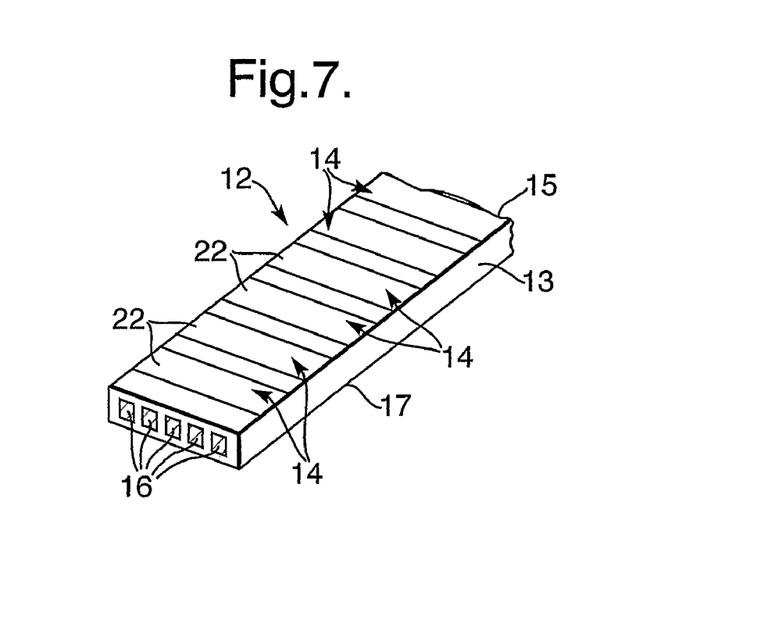
FIG. 7 is an enlarged perspective view of a fuel cell module.

A fuel cell arrangement 10 according to the present invention is shown in FIGS. 1 to 3. The fuel cell arrangement 10 comprises at least one solid oxide fuel cell module 12, preferably there are a plurality of solid oxide fuel cell modules 12. Each solid oxide fuel cell module 12 comprises a hollow porous support member 13 and a plurality of solid oxide fuel cells 14. Each hollow porous support member 13 has at least one chamber 16 extending therethrough and comprises two planar, parallel, flat surfaces 15 and 17 upon which the solid oxide fuel cells 14 are arranged, as shown more clearly in FIG. 7. Each solid oxide fuel cell module 12 is a sealed assembly, while allowing the flow of fuel through the at least one chamber 16 in the hollow porous support member 13. Each solid oxide fuel cell 14 comprises an anode electrode 18, a cathode electrode 22 and an electrolyte 20. The solid oxide fuel cells 14 are arranged such that the anode electrodes 18 are arranged on the outer surface, the two planar, parallel, flat surfaces 15 and 17, of the hollow porous support member 13, the electrolytes 20 are arranged on the anode electrodes 18 and the cathode electrodes 22 are arranged on the electrolytes 20. The solid oxide fuel cells 14 are also arranged such that the anode electrode 18 of one solid oxide fuel cell 14 is electrically connected in series with the cathode electrode 22 of an adjacent solid oxide fuel cell 14.

In this arrangement each solid oxide fuel cell module 12 is arranged within a single inner vessel 24 and the inner vessel 24 is arranged within an outer pressure vessel 28. In this arrangement the inner vessel 24 defines a space 26 and a space 30 is defined between the inner vessel 24 and the outer pressure vessel 28. The inner vessel 24 and the outer pressure vessel 28 are preferably substantially tubular, e.g. circular in cross-section, and arranged coaxially. Other suitable shapes may be used for the inner vessel and the pressure vessel and they need not be arranged coaxially.

There are means 32 to supply oxidant to the cathode electrodes 22 of the solid oxide fuel cells 14 of the at least one fuel cell module 12 and there are means 34 to supply fuel to the anode electrodes 18 of the solid oxide fuel cells 14 of the at least one solid oxide fuel cell module 12.

The means 32 to supply oxidant comprises a pump, not shown, to supply compressed air, or oxygen, via a pipe 36 into the space 30 between the inner vessel 24 and the outer pressure vessel 28. The means 32 to supply, oxidant also comprises a pipe 38 to supply the oxidant, compressed air or oxygen, from the space 30 into the space 26 within the inner vessel 24. The means 32 to supply oxidant may further comprise flow guide members, or ducts, (not shown) to direct the flow of oxidant, compressed air or oxygen, in the space 26 such that the oxidant flows over the cathode electrodes 22 of the solid oxide fuel cells 14 of the at least one solid oxide fuel cell module 12 and thus the means 32 to supply oxidant is arranged to supply oxidant to the space 26 within the inner vessel 24 and the space 26 within the inner vessel 24 is arranged to supply oxidant to the cathode electrodes 22.

The means 34 to supply fuel comprises a pump, not shown, to supply preformed fuel, reformed fuel, pre-processed fuel or unreformed fuel, via pipe 42 directly through the outer pressure vessel 28, the inner vessel 24 into a chamber 16 in the hollow porous support member 13 of the at least one fuel cell module 12 and then from the chamber 16 through the hollow porous support member 13 to the anode electrodes 18 of the solid oxide fuel cells 14 of the at least one solid oxide fuel cell module 12 and thus the means 34 to supply fuel is arranged to supply fuel to the chamber 16 in the at least one fuel cell module 12 and the chamber 16 in the at least one fuel cell module 12 is arranged to supply fuel to the anode electrodes 18 of the at least one fuel cell module 12. The fuel prereformer and fuel pre-processor remove higher hydrocarbons and sulphur from the fuel.

A portion 42A of the fuel pipe 42, the portion passing through the space 30 between the pressure vessel 28 and the inner vessel 24, preferably comprises an inner pipe and an outer pipe such that leakage of any fuel from the inner pipe is contained within the outer pipe and is prevented from entering the space 30, so that there cannot be a build up of unburned fuel.

There are means 44 to remove the exhaust gases from the cathode electrodes 20 of the solid oxide fuel cells 14 of the at least one solid oxide fuel cell module 12. The means 44 to remove the exhaust gases comprises a pipe 46, which passes directly through the inner vessel 24 and the outer pressure vessel 28. The means 44 to remove the exhaust gases further comprises flow guide members, or ducts, (not shown) to direct the flow of exhaust gases in the space 26 such that the exhaust flows from the cathode electrodes 22 of the solid oxide fuel cells 14 of the at least one solid oxide fuel cell module 12 to the pipe 46.

The design is arranged such that in operation the pressure in the space 30 between the inner vessel 24 and the outer pressure vessel 28 is different to, higher than, the pressure in the space 26 within the inner vessel 24 such that normally the inner vessel 24 is subjected to a compressive load. The pressure difference between the space 26 and the space 30 on opposite sides of the inner vessel 24 is arranged to be less than the pressure difference between the space 30 and atmosphere on opposite sides of the outer pressure vessel 28.

In this arrangement the cooler outer pressure vessel 28 is highly loaded, highly stressed, and the hotter inner vessel 24 is more lightly loaded, lightly stressed, and the inner vessel 24 is designed to resist buckling, rather than to have high creep strength under all operating conditions.

In addition the design is arranged such that there is oxidant, compressed air or oxygen, in the space 30 between the inner vessel 24 and the outer pressure vessel 28 and there is oxidant, compressed air or oxygen, in the space 26 within the inner vessel 24. The design is arranged such that the fuel is only within the hollow porous support members 13 of the solid oxide fuel cell modules 12 and the pipe 42.

Also the temperature within the space 30 may be below the auto-ignition temperature of the fuel. The space between the inner and outer pipes is vented to atmosphere and preferably the space between the inner and outer pipes is monitored to detect the presence of leaking fuel, so that the inner pipe may be repaired or replaced.

In operation the flow of the oxidant, compressed air or oxygen, through the space 30 between the inner vessel 24 and the outer pressure vessel 28, as indicated by arrow B, acts as a coolant flow for the inner vessel 24 and as a thermal barrier to heat flow from the inner vessel 24 to the outer pressure vessel 28. The positions of the pipes 36 and 38 are chosen to maximise the effectiveness of the flow of oxidant, compressed air or oxygen, to provide cooling of the inner vessel 24 and to provide a thermal barrier to the heat flux. In this arrangement the position of the pipe 38 into the inner vessel 24 is at the opposite end of the inner vessel 24 relative to the position of the pipe 36 into the outer pressure vessel 28.

The flow of the oxidant, compressed air or oxygen, through the space 26 within the inner vessel 24 is indicated by arrow C.

FIG. 3 shows the inner vessel 24 and the outer pressure vessel 28 in more detail. A layer of insulation 48 is provided on the outer surface of the outer pressure vessel 28 to reduce heat loss to maximise the efficiency of the system and to protect personnel. External insulation of the outer pressure vessel 28 is preferred to internal insulation of the outer pressure vessel 28 because it allows inspection of the inner surface of the outer pressure vessel 28, which is required periodically for safety reasons and to satisfy compulsory inspection requirements of pressure vessels. External insulation of the outer pressure vessel also avoids accelerated corrosion, which is known to occur with internal insulation at the pressure vessel/insulation interface.

A layer of insulation 50 is provided on the inner surface of the inner vessel 24 and preferably a space 52 is provided between the layer of insulation 50 and the inner surface of the inner vessel 24. This layer of insulation 50 and space 52 enable the inner vessel 24 to operate at a substantially lower temperature than the solid oxide fuel cell module 12. Additional layers of insulation and spaces may be provided within the inner vessel 24 to further reduce the operating temperature of the inner vessel 24. An additional layer of insulation 54 may be provided on the outer surface of the inner vessel 24 to further reduce the heat flux transmitted from the inner vessel 24 to the outer pressure vessel 28. A space may be provided between the layer of insulation 54 and the outer surface of the inner vessel 24.

The use of the insulating layers 48, 50 and 54 and the spaces 30 and 52 for a cooling flow of oxidant permits the use of affordable and readily available alloys for the inner vessel 24 and the outer pressure vessel 28. The mass of alloy/metal used to make the inner vessel 24 and the outer pressure vessel, particularly the outer pressure vessel 28, is significant and the avoidance of the use of expensive high temperature superalloys is important in minimising the cost of the fuel cell arrangement 10.

Figure 4:
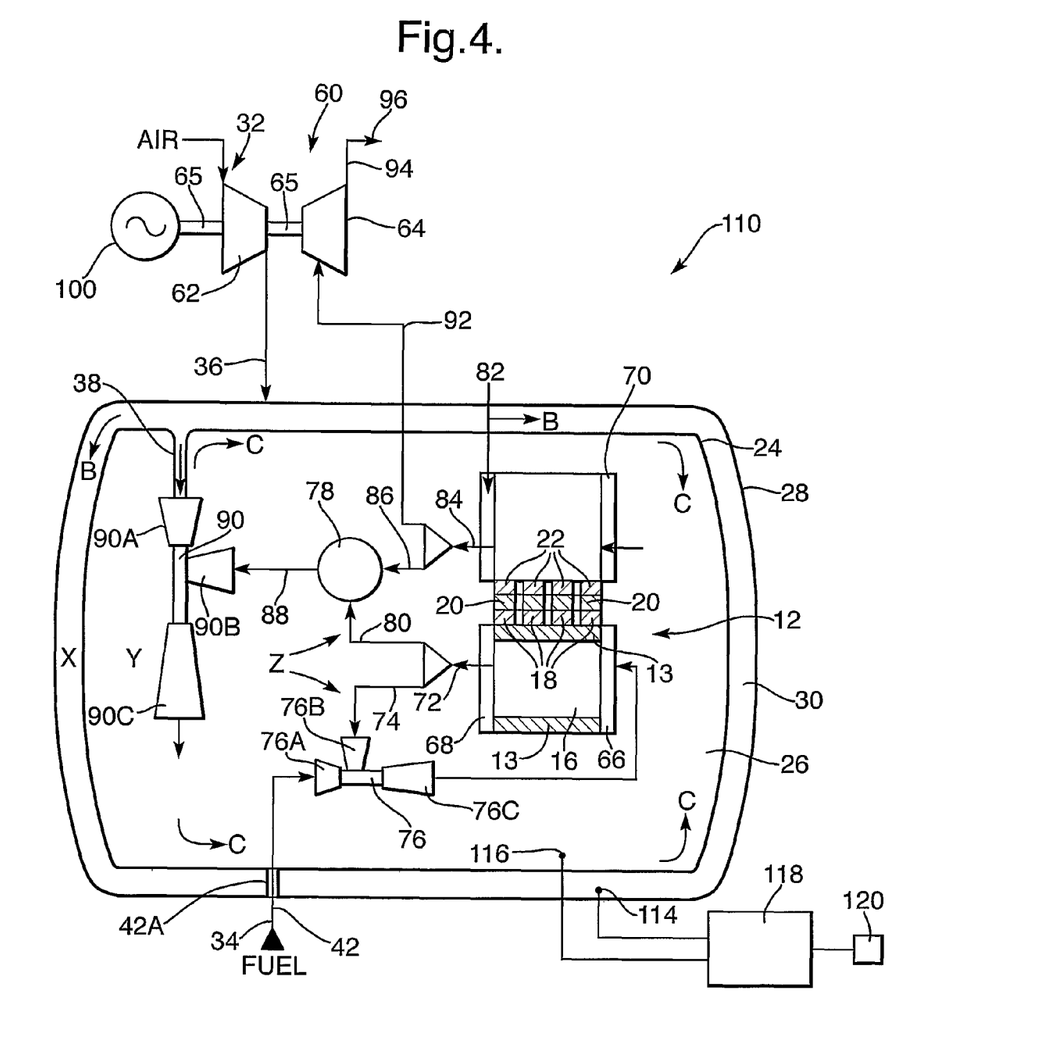
FIG. 4 is a longitudinal cross-sectional view through an alternative fuel cell arrangement according to the present invention.

An alternative fuel cell arrangement 110 according to the present invention is shown in FIG. 4, and like parts are denoted by like numerals.

In this arrangement the fuel cell arrangement 110 also comprises a gas turbine engine 60. The gas turbine engine 60 comprises a compressor 62 and a turbine 64, and the turbine 64 is arranged to drive the compressor 62 via a shaft 65.

The anode electrodes 18 of the solid oxide fuel cells 14 on the hollow support member 13 of the solid oxide fuel cell module 12 are supplied with a fuel by a fuel supply manifold 66 from the pipe 42. The cathode electrodes 22 of the solid oxide fuel cells 14 of the solid oxide fuel cell module 12 are supplied with oxidant by an oxidant manifold 70.

The anode electrodes 18 are provided with an unused fuel collection manifold 68 into which unused fuel is discharged. The unused fuel collection manifold 68 is connected to the pipe 42 via pipes 72 and 74 such that a first portion of the unused fuel is supplied, recirculated, to the fuel manifold 66. A fuel ejector 76 is provided to induce the supply, recirculation, of unused fuel from the unused fuel collection manifold 68 to the fuel manifold 66. The pipes 72, 74 and fuel ejector 76 form means to recirculate the unused fuel from the anode electrodes 18 of the solid oxide fuel cells 16 back to the anode electrodes 18 of the solid oxide fuel cells 16. The fuel ejector 76 pressurises the unused fuel and mixes the unused fuel with the fuel supplied by the fuel supply 34 through the pipe 42 to the fuel manifold 66. The unused fuel from the unused fuel collection manifold 68 is supplied to the secondary nozzle 76B of the fuel ejector 76, fuel from the fuel supply 34 is supplied to the primary nozzle 76A of the fuel ejector 76 and the mixed unused fuel and fuel is discharged from exhaust nozzle 76C to the fuel manifold 66.

The unused fuel collection manifold 68 is also connected to a combustor 78 via the pipe 72 and a further pipe 80 such that a second portion of the unused fuel is supplied to the combustor 78.

The cathode electrodes 22 are provided with an unused oxidant collection duct 82 into which unused oxidant is discharged. The unused oxidant collection duct 82 is connected to the space 26 within the inner vessel 24 via ducts 84 and 86, the combustor 78 and a duct 88 such that a first portion of the unused oxidant is supplied, recirculated, to the oxidant manifold 70. An oxidant ejector 90 is provided to induce the supply, recirculation, of unused oxidant from the unused oxidant collection duct 82 to the oxidant manifold 70. The ducts 84, 86, 88 and oxidant ejector 90 form means to recirculate unused oxidant from the cathode electrodes 22 of the solid oxide fuel cells 16 back to the cathode electrodes 22 of the solid oxide fuel cells 14. The duct 84, 86 and 88 are defined by portions of the inner vessel 24.

The second portion of unused fuel supplied to a fuel burner in the combustor 78 is burnt in the first portion of unused oxidant supplied to the combustor 78 to produce hot gases. The hot gases produced in the combustor 78 are arranged to flow with unused oxidant through the duct 88 and the oxidant ejector 90 into the space 26 between the inner vessel 24 and the housing 16 and thence to the oxidant manifold 70. The products, the hot gases and unused oxidant, of the combustor 78 are supplied by the combustor 78 and duct 88 to the to the secondary nozzle 90B of the oxidant ejector 90. The oxidant ejector 90 pressurises the products of the combustor 78 and mixes the products of the combustor 78 with the oxidant supplied by the compressor 62 to the primary nozzle 90A of the oxidant ejector 90 to preheat the oxidant supplied by the compressor 62. The oxidant ejector 90 discharges the mixed gases from the exhaust nozzle 90C of the oxidant ejector 90 into the space 26.

The unused oxidant collection duct 82 is also connected to the turbine 64 via the duct 84 and a further duct 92 such that a second portion of the unused oxidant is supplied to the turbine 64. The second portion of the unused oxidant drives the turbine 64. The second portion of the unused oxidant then flows through a pipe 94 and is discharged through an exhaust 96. The turbine 64 may also drive an electrical generator 100.

In this arrangement three distinct zones X, Y and Z are created. The zone X, the space 30 between the inner vessel 24 and the outer pressure vessel 28, the zone Y, the space 26 between the inner vessel 24 and the solid oxide fuel cell modules 12, and the zone Z, the space within the fuel pipe 42, fuel supply manifold 66, the hollow porous support member 13, the unused fuel collection manifold 68, the pipes 72 and 80 to the combustor 78, the pipe 74 and the fuel ejector 76. The zone X, the space 30, contains compressed oxidant, e.g. compressed air or oxygen. The zone Y, the space 26, contains unused oxidant from the unused oxidant collection manifold 92 and hot gases produced by the combustor 78 and oxidant supplied by the compressor 62. The hot gases from the combustor 78 has no fuel content for practical purposes and creates a safe zone and provides an oxidising atmosphere. The presence of an oxidising environment in zone Y, space 26, is important because it allows the use of conventional high temperature alloys to make a high integrity inner vessel 24. Such high temperature alloys are designed to operate with good high temperature corrosion resistance and strength in an oxidising atmosphere. The zone Z is the only space where fuel is present and even then it is contained within pipes 42, 72, 74 and 80, fuel ejector 76, the fuel burner in the combustor 78 and the hollow support member 13 of the solid oxide fuel cell modules 12. Failure of any of the pipes 42, 72, 74 or 80, fuel ejector 76, fuel burner or hollow support member 13 of the solid oxide fuel cell modules 12 would have to occur to release fuel into zone Y. If there was a release of fuel into the zone Y to achieve a stoichiometric temperature, the pressure peak would only be 30 bar, which is containable by the pressure vessel system. As an additional safety consideration, the zone Z is a compact volume and the total amount of fuel present in zone Z is small, so that even if all the fuel leaked from zone Z and mixed with oxidant, compressed air or oxygen, in zone Y before igniting, the resulting overpressure is modest and is easily contained by the outer pressure vessel.

A first pressure sensor 114 is arranged to measure the pressure in the space 30 between the inner vessel 24 and the outer pressure vessel 28, a second pressure sensor 116 is arranged to measure the pressure in the space 26 in the inner vessel 24 and a monitor 118 is arranged to compare the pressure measured by the first pressure sensor 114 and the pressure measured by the second pressure sensor 116 to determine if there is an overpressure due to component malfunction or burning of fuel in one or more of the solid oxide fuel cell module(s) 12. The monitor 118 sends a signal to an indicator 120, an alarm or a display, if an overpressure is detected. The monitor 118 may also send a signal to shut down the solid oxide fuel cell arrangement if an overpressure is detected.

Figure 5:
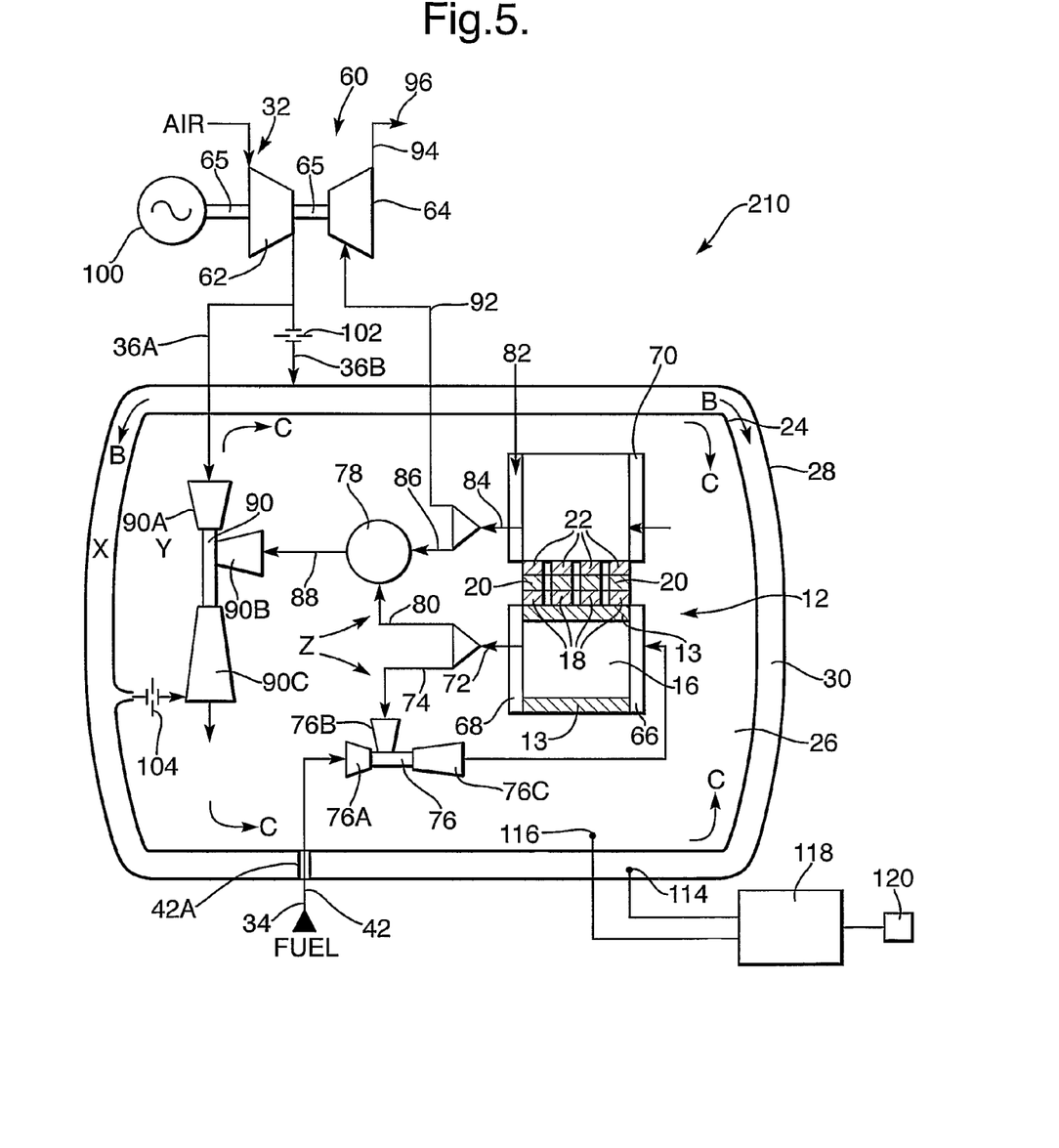
FIG. 5 is a longitudinal cross-sectional view through an alternative fuel cell arrangement according to the present invention.

A further fuel cell arrangement 210 according to the present invention is shown in FIG. 5, and is similar to the arrangement shown in FIG. 4 and like parts are denoted by like numerals.

The fuel cell arrangement 210 in FIG. 5 differs in that the flow of oxidant supplied by the compressor 62 is divided and a first portion is supplied through pipe 36A directly, at full pressure, to the primary nozzle 90A of the oxidant ejector 90 and a second portion is supplied through pipe 36B and a restrictor, or an alternative pressure drop device, 102 to the space 30, zone X, between the inner vessel 24 and the outer pressure vessel 28. The second portion of oxidant subsequently enters the space 26, zone Y, by flowing through a restrictor, or an alternative pressure drop device, 104 and mixing with the flow out of the exhaust nozzle 90C of the oxidant ejector 90. The relative sizes of the restrictors 102 and 104 determines the pressure in zone X, space 30. The pressure in zone X, space 30, is between the pressure of the compressed oxidant supplied by the compressor 62 and the pressure in zone Y, space 26. The pressure in zone X is less than the pressure delivered by the compressor 62 and the pressure in zone X is greater than the pressure in zone Y. Thus, this arrangement controls the pressure drop across the inner vessel 24 and is arranged to reduce the normal pressure load/drop across the inner vessel 24 by lowering the pressure in zone X, space 30.

The oxidant ejector may be a jet pump. Alternatively other means may be provided to pressurise and mix the products of the combustor with the oxidant supplied by the compressor. For example a turbomachine, a fan, a pump or a blower may be provided to pressurise the products of the combustor and a separate mixer may be provided to mix the products of the combustor and the oxidant. The turbomachine may be driven by a free power turbine. The fan, pump or blower may be driven by a free power turbine, electrically or by other suitable means.

The fuel ejector may be a jet pump. Alternatively other means may be provided to pressurise and mix the unused fuel with the fuel supplied by the fuel supply. For example a turbomachine, a fan, a pump or a blower may be provided to pressurise the unused fuel and a separate mixer may be provided to mix the unused fuel and the fuel. The turbomachine may be driven by a free power turbine. The fan, pump or blower may be driven by a free power turbine, electrically or by other suitable means.

Figure 6:
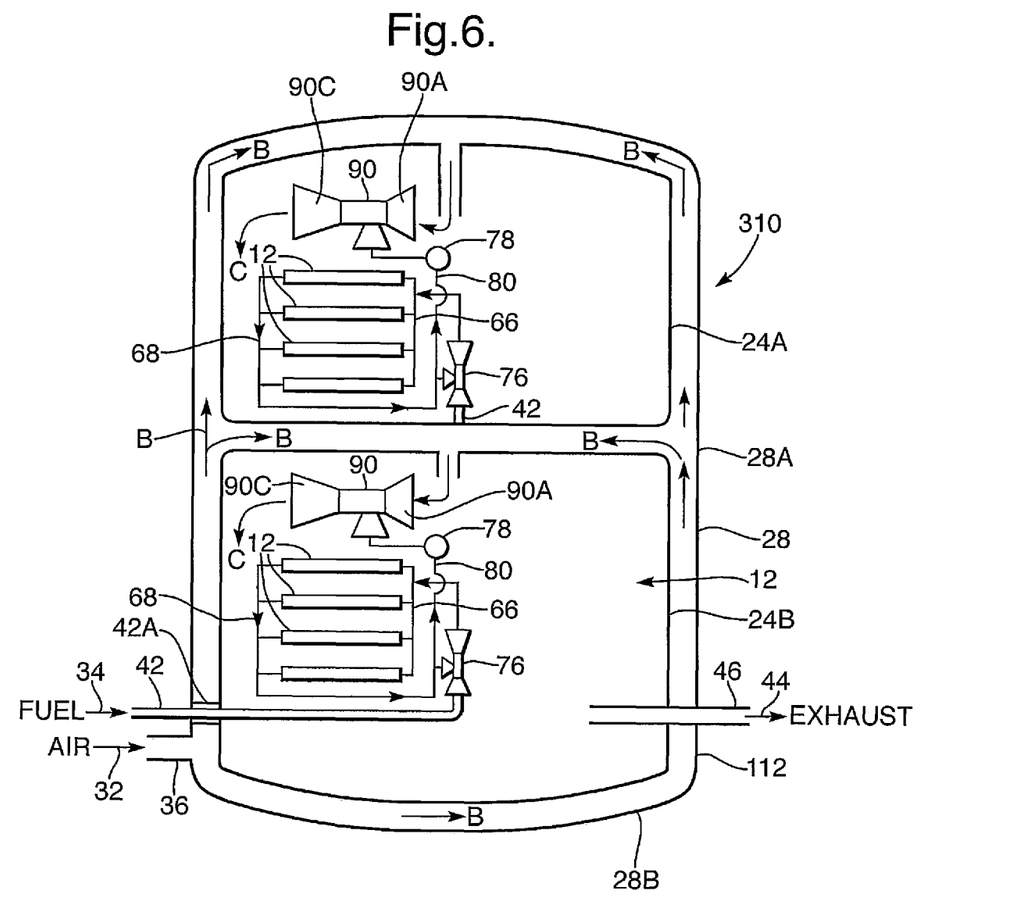
FIG. 6 is a longitudinal cross-sectional view through an alternative fuel cell arrangement according to the present invention.

An alternative fuel cell arrangement 310 according to the present invention is shown in FIG. 6, and is similar to that shown in FIG. 4 and like parts are denoted by like numerals. The fuel cell arrangement 310 differs in that there is a plurality of inner vessels 24A and 24B arranged within the outer pressure vessel 28. In this arrangement the inner vessels 24A and 24B are arranged coaxially within the outer pressure vessel 28 with a space 30 therebetween. The inner vessels 24A and 24B and the outer pressure vessel 28 are substantially tubular, e.g: circular in cross-section, but other suitable shapes may be used. The inner vessels 24A and 24B may be toroidal in shape.

Furthermore, this arrangement shows a plurality of solid oxide fuel cell modules 12 in each of the inner vessels 24A and 24B.

In this arrangement the solid oxide fuel cell modules 12 are arranged such that the longitudinal direction of the solid oxide fuel cell modules 12 extend substantially radially with respect to the axes of the inner vessels 24A and 24B and with the flat surfaces 15 and 17 of the solid oxide fuel cell modules 12 arranged in planes perpendicular to the axes of the inner vessels 24A and 24B. The solid oxide fuel cell modules 12 are arranged in stacks such that the solid oxide fuel cell modules 12 are spaced apart axially and the stacks are circumferentially arranged around the axes of the inner vessels 24A and 24B. The flow of oxidant across the flat surfaces 15 and 17, and hence the cathode electrodes 22, is arranged to be radially inwardly or circumferentially with respect to the axis of the inner vessels 24A and 24B. To aid the radially inward flow of oxidant it is preferred that the oxidant ejector, or oxidant ejectors, 90 are arranged such that they extend radially with respect to the axes of the inner vessels 24A and 24B with the primary nozzles 90A arranged at the radially inner ends and the exhaust nozzles 90C at the radially outer ends.

In another arrangement, not shown, the solid oxide fuel cell modules 12 are arranged such that the longitudinal direction of the solid oxide fuel cell modules 12 extend substantially perpendicularly with respect to radii from the axes of the inner vessels 24A and 24B and with the flat surfaces 15 and 17 of the solid oxide fuel cell modules 12 arranged in planes perpendicular to the axes of the inner vessels 24A and 24B. The solid oxide fuel cell modules 12 are arranged in stacks such that the solid oxide fuel cell modules 12 are spaced apart axially and the stacks are circumferentially arranged around the axes of the inner vessels 24A and 24B. The flow of oxidant across the flat surfaces 15 and 17, and hence the cathode electrodes 22, is arranged to be radially inwardly with respect to the axis of the inner vessels 24A and 24B. To aid the radially inward flow of oxidant it is preferred that the oxidant ejector, or oxidant ejectors, 90 are arranged such that they extend radially with respect to the axes of the inner vessels 24A and 24B with the primary nozzles 90A arranged at the radially inner ends and the exhaust nozzles 90C at the radially outer ends.

The radially inward flow of oxidant across the fuel cell modules 12 produces an accelerating flow due to the reduction in flow area in the radially inward direction and this prevents flow separation.

It is preferred to arrange the axes of the outer pressure vessel and inner vessels vertically, but it may be possible to arrange the axes of the outer pressure vessel and inner vessels horizontally.

Figure 8:
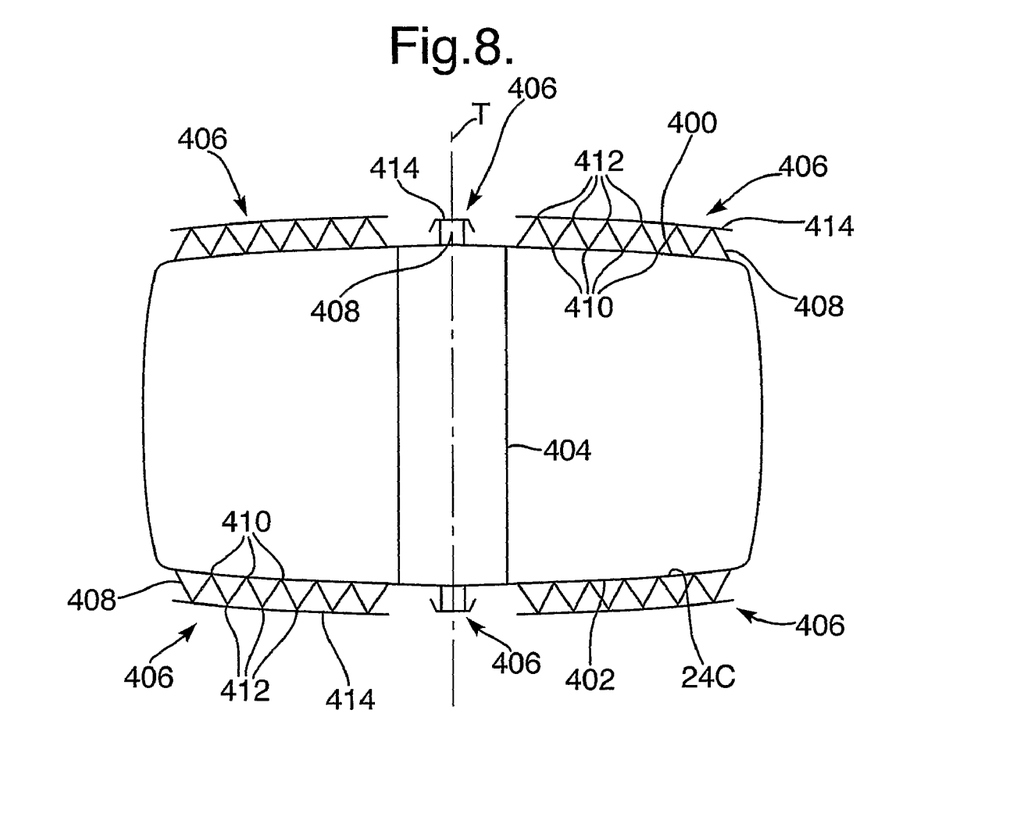
FIG. 8 is a cross-sectional view through an inner vessel of an alternative inner vessel suitable for use in FIG. 6.

An alternative inner vessel suitable for use in the fuel cell arrangement of FIG. 6 is shown in FIG. 8. The inner vessel 24C is tubular and has an axis T. The inner vessel 24C has a first end 400 and a second end 402. The inner vessel 24C is provided with an internal tubular support member 404, which is coaxial with the inner vessel 24C and which extends between and is secured to the first and second ends 400 and 402 to stiffen the inner vessel 24C. The inner vessel 24C is provided with a plurality of devices 406, which allow radial expansion and contraction of the first and second ends 402 and 404 of the inner vessel 24C, due to thermal expansion and contraction of the tubular support member 404. The devices 406 resist axial load, compression or tension, on the inner vessel 24C. The devices 406 are preferably arranged on both of the first and second ends 400 and 402 of the inner vessel 24C, but it may possible to provide them on only one of the first and second ends 400 and 402 of the inner vessel 24C.

Each device 406 comprises a corrugated elongate member 408 which has longitudinally spaced apart troughs 410 and longitudinally spaced apart peaks 412. The corrugated elongate member 408 is secured or joined, for example by welding, brazing or bonding, at its longitudinally spaced troughs 410 to an end 400 or 402 of the inner vessel 24C. The corrugated elongate member 408 is secured or joined, for example by welding, brazing or bonding, at its longitudinally spaced peaks 412 to an elongate member 414. The elongate member 414 is U-shaped in cross-section and the corrugated elongate member 408 is secured or joined to the elongate member 414 to the surface between the limbs of the U-shaped elongate member 414.

Each device 406 extends radially relative to the axis T of the inner vessel 24C and thus there is a plurality of devices 406 angularly spaced apart on each of the first and second ends 400 and 402 or on one of the first and second ends 400 and 402.

Figure 9:
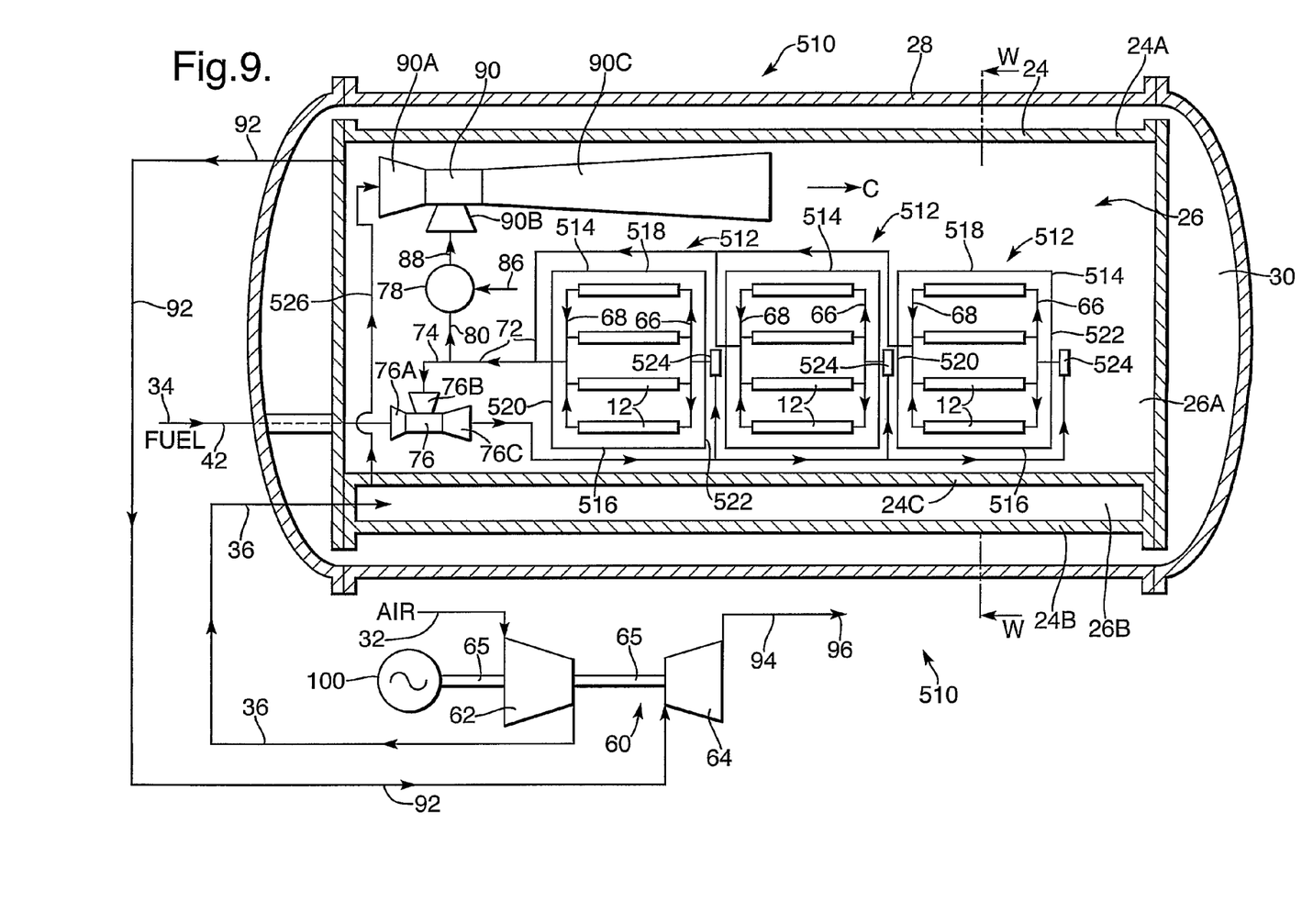
FIG. 9 is a longitudinal schematic cross-sectional view through an alternative fuel cell arrangement according to the present invention.
Figure 10:
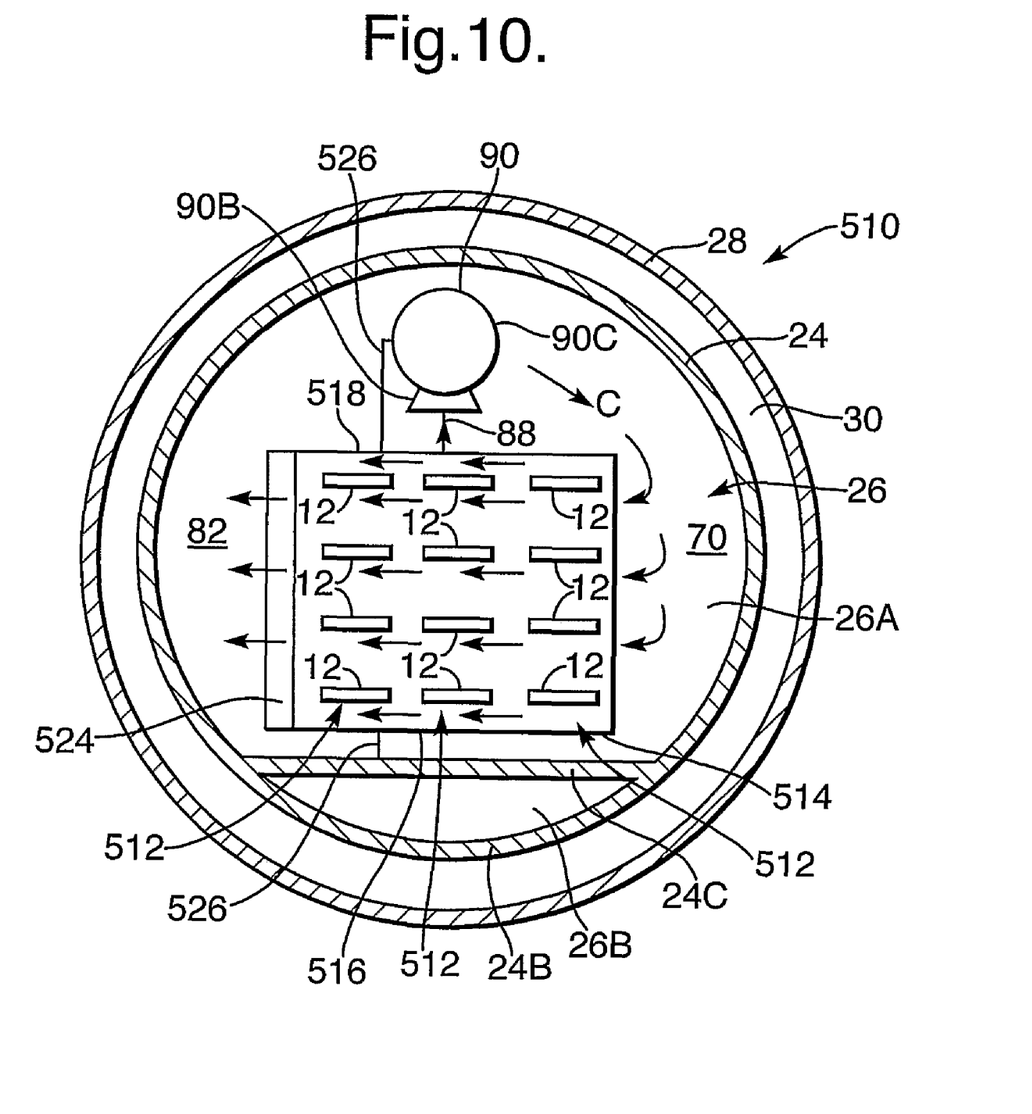
FIG. 10 is a sectional view along line W-W in FIG. 9.

A further fuel cell arrangement 510 according to the present invention is shown in FIGS. 9 and 10 and is similar to that shown in FIG. 4, and like parts are denoted by like numerals.

In this arrangement the fuel cell arrangement 510 also comprises a gas turbine engine 60. The gas turbine engine 60 comprises a compressor 62 and a turbine 64, and the turbine 64 is arranged to drive the compressor 62 via a shaft 65.

The anode electrodes 18 of the solid oxide fuel cells 14 on the hollow support member 13 of the solid oxide fuel cell module 12 are supplied with fuel by a fuel supply manifold 66 from the pipe 42. The cathode electrodes 22 of the solid oxide fuel cells 14 of the solid oxide fuel cell module 12 are supplied with oxidant by an oxidant manifold 70.

The anode electrodes 18 are provided with an unused fuel collection manifold 68 into which unused fuel is discharged. The unused fuel collection manifold 68 is connected to the pipe 42 via pipes 72 and 74 such that a first portion of the unused fuel is supplied, recirculated, to the fuel manifold 66. A fuel ejector 76 is provided to induce the supply, recirculation, of unused fuel from the unused fuel collection manifold 68 to the fuel manifold 66. The pipes 72, 74 and fuel ejector 76 form means to recirculate the unused fuel from the anode electrodes 18 of the solid oxide fuel cells 14 back to the anode electrodes 18 of the solid oxide fuel cells 14. The fuel ejector 76 pressurises the unused fuel and mixes the unused fuel with the fuel supplied by the fuel supply 34 through the pipe 42 to the fuel manifold 66. The unused fuel from the unused fuel collection manifold 68 is supplied to the secondary nozzle 761B of the fuel ejector 76, fuel from the fuel supply 34 is supplied to the primary nozzle 76A of the fuel ejector 76 and the mixed unused fuel and fuel is discharged from the exhaust nozzle 76C to the fuel manifold 66.

The unused fuel collection manifold 68 is also connected to a combustor 78 via the pipe 72 and a further pipe 80 such that a second portion of the unused fuel is supplied to the combustor 78.

The cathode electrodes 22 are provided with an unused oxidant collection duct 82 into which unused oxidant is discharged. The unused oxidant collection duct 82 is defined by the space 26 within the inner vessel 24. The unused oxidant collection duct 82 is connected to the duct 86, the combustor 78 and a duct 88 such that a first portion of the unused oxidant is supplied, recirculated, to the oxidant manifold 70. An oxidant ejector 90 is provided to induce the supply, recirculation, of unused oxidant from the unused oxidant collection duct 82 to the oxidant manifold 70. The ducts 86, 88 and the oxidant ejector 90 form means to recirculate unused oxidant from the cathode electrodes 22 of the solid oxide fuel cells 14. The ducts 84, 86 and 88 are defined by the portions of the inner vessel 24.

The second portion of unused fuel is supplied to a fuel burner in the combustor 78 and is burnt in the first portion of unused oxidant supplied to the combustor 78 to product hot gases. The hot gases produced in the combustor 78 are arranged to flow with unused oxidant through the duct 88 and oxidant ejector 90 into the space 26 within the inner vessel 24 and thence to the oxidant manifold 70. The products, the hot gases and unused oxidant, of the combustor 78 are supplied by the combustor 78 and the duct 88 to the secondary nozzle 90B of the oxidant ejector 90. The oxidant ejector 90 pressurises the products of the combustor 78 and mixes the products of the combustor 78 with the oxidant supplied by the compressor 62 to the primary nozzle 90A of the oxidant ejector 90 to preheat the oxidant supplied by the compressor 62. The oxidant ejector 90 discharges the mixed gases from the exhaust nozzle 90C of the oxidant ejector 90 into the space 26.

The unused oxidant collection duct 82 is also connected to the turbine 64 via the duct 92 such that a second portion of the unused oxidant is supplied to the turbine 64. The second portion of the unused oxidant drives the turbine 64. The second portion of the unused oxidant then flows through a pipe 94 and is discharged through an exhaust 96. The turbine 64 may also drive an electrical generator 100.

In this arrangement the axes of the outer pressure vessel 28 and the inner vessel 24 are arranged coaxially with the space 30 therebetween and the axes of the outer pressure vessel 28 and the inner vessel 24 extend horizontally. A plurality of the solid oxide fuel cell modules 12 are arranged within the inner vessel 24 and the solid oxide fuel cell modules 12 are arranged such that the longitudinal direction of the solid oxide fuel cell modules 12 extend substantially horizontally and parallel to the axis of the inner vessel 24 and with the flat surfaces 15 and 17 of the solid oxide fuel cell modules 12 arranged in substantially horizontal planes. The solid oxide fuel cell modules 12 are arranged in stacks 512 such that the solid oxide fuel cell modules 12 in each stack 512 are spaced apart vertically and the stacks 512 are spaced apart horizontally in the axial direction. Also at each axial position there are a plurality of stacks 512 of solid oxide fuel cell modules 12 spaced apart horizontally substantially transverse to the axial direction. The flow of oxidant across the flat surfaces 15 and 17, and hence the cathode electrodes 22, of the solid oxide fuel cell modules 12 is arranged to be transverse to the axial direction with respect to the axis of the inner vessel 24. To aid the flow of oxidant the stacks 512 of solid oxide fuel cell modules 12 at each axial position are located in boxes 514. The boxes 514 have a base 516, a top 518, two axially spaced sides 520 and 522 and two open ends. Each stack 512 of solid oxide fuel cell modules 12 is supplied with fuel from a fuel supply manifold 66 and supplies unused fuel to an unused fuel collection manifold 68, as discussed previously. Oxidant flows into the boxes 514 through one open end of each box 514 from the oxidant supply manifold 70, over the cathode electrodes 22 of the solid oxide fuel cells 14 of the solid oxide fuel cell modules 12 and out of the other open end of each box 514 to a respective fuel reformer 524. Each fuel reformer 524 is heated by the respective flow of oxidant. The oxidant from each box 514 then flows to the oxidant collection duct 82 and then flows either through the duct 92 to the turbine 64 or through the duct 86 to the combustor 78. Each fuel reformer 524 supplies fuel to the fuel supply manifold 66 for the stacks 512 in the associated box 514. The unused fuel in the unused fuel collection manifolds 68 is supplied through the duct 80 to the combustor 78 or through the duct 74 to the fuel ejector 76 as discussed previously. The top 518 and sides 520 and 522 of the boxes 514 are provided with insulation. The boxes 514 define flow guide members to direct the flow of oxidant, compressed air or oxygen, in the space 26 such that the oxidant flows over the cathode electrodes 22 of the solid oxide fuel cells 14 of the solid oxide fuel cell modules 12. The cathode electrodes 22 are thus in contact with the oxidant in the space 26 within the inner vessel 24.

The arrangement in FIG. 9 differs in that the oxidant from the compressor 62 is not supplied directly to the space 30 between the inner vessel 24 and the outer pressure vessel 28, instead the oxidant is supplied directly to a space 26B defined by a portion 24C of the inner vessel 24 and a wall member 24B secured to the inner vessel 24. The oxidant is then supplied from the space 26B to the primary nozzle 90A of the oxidant ejector 90. The space 26B is pressurised to a pressure substantially the same as the pressure of the oxidant supplied by the compressor 62 and is the same as the pressure in the space 30 between the inner vessel 24 and the outer pressure vessel 28. No flammable gases are present in the space 26B so that the safety is not significantly affected. The connection of the pipe 36 from the compressor 62 to the space 26B is not sealed, so that the space 30 between the inner vessel 24 and the outer pressure vessel 28 is pressurised to the pressure of the oxidant supplied by the compressor 62, but there is no flow of oxidant around, or through, the space 30. The space 26B is connected to the oxidant ejector 90 by a duct 526. The space 26B is separated from the space 26A in the inner vessel 24 by the portion 24C of inner vessel 24, which is a horizontal wall so that the pressure in the space 30 between the inner vessel 24 and the outer pressure vessel 28 and the pressure in the space 26B is higher than the pressure in the space 26A in the inner vessel 24.

The space 26B is also used to provide electrical cables, pipes etc.

The fuel cell arrangements in FIGS. 1, 4, 5, 6 and 8 are preferably arranged such that the axes of the outer pressure vessel and the inner vessel are arranged vertically, but the axes of the outer pressure vessel and the inner vessel may be arranged horizontally.

The fuel cell arrangement of the present invention has a number of advantages. The most important advantages relate to safety risks and pressure containment integrity.

The presence of the inner vessel, or inner vessels, and its, or their, associated insulation and cooling enables the outer pressure vessel to operate with a greater safety margin on temperature during normal operation and the outer pressure vessel is protected from direct exposure to flames and high temperatures which may occur following a failure of a solid oxide fuel cell module.

The entire volume within the inner vessel, or inner vessels, into which the solid oxide fuel cell module, or solid oxide fuel cell modules, may leak can be maintained above a predetermined temperature, the auto-ignition temperature, for the possible fuel/oxidant mixtures. This makes the fuel cell arrangement safer because it is impossible for a build up of leaking fuel outside the fuel pipes to create conditions suitable for an explosion, because the leaking fuel immediately ignites and burns at the leak site or leak sites. These conditions apply for all generating load points for the fuel cell arrangement, leaving only short periods during the start up and cool down phases where this is not so and other precautions against explosive ignition are taken.

The detection of overpressure in the fuel cell arrangement due to malfunction of components or ignition of fuel in the fuel cell module is easy because it produces a pressure difference reversal across the inner vessel, e.g. at normal conditions the pressure inside the inner vessel is less than the pressure between the inner vessel and the outer pressure vessel and at overpressure conditions the pressure inside the inner vessel is more than the pressure between the inner vessel and the outer pressure vessel.

The use of a double vessel arrangement, e.g. inner vessel, or inner vessels, and outer pressure vessel, enables the outer pressure vessel to be protected from the high temperature environment of the fuel cell stack by the inner vessel, or inner vessels. The outer pressure vessel forms the main pressure containment of the arrangement and operates at a lower temperature than a single pressure vessel arrangement and operates with a greater safety margin than a single pressure vessel arrangement.

In one arrangement the use of insulation on the inside of the inner vessel and the use of an air supply to the cathode electrodes of the fuel cell stack as a coolant between the inner vessel and the outer pressure vessel allows the use of lower grade, and hence cheaper, alloys for the pressure vessels.

In another arrangement the air between the inner vessel and outer pressure vessel is stagnant and acts as a further layer of insulation.

The inner vessel, or inner vessels, only have to withstand low pressure loading, and hence stress levels, and allow the complete enclosed volume within the inner vessel, or inner vessels, to operate above the auto-ignition temperature of fuel and air mixtures that may be present in the case of a fault/leak. This brings significant safety advantages by preventing the development of conditions suitable for an explosion and avoids considerable complication of the fuel cell arrangement to prevent explosions.

The present invention enables the use of a physical, configuration for the cost effective implementation of a fuel cell arrangement with recirculation of the unused oxidant from the cathode electrodes back to the cathode electrodes together with the products of combustion of the unused oxidant from the cathode electrodes and unused fuel from the anode electrodes and fresh oxidant. This fuel cell arrangement also has recirculation of the unused fuel from the anode electrodes back to the cathode electrodes together with fresh fuel. Although the present invention has been described with reference to solid oxide fuel cell modules with solid oxide fuel cells arranged thereon, and supported by, a hollow porous support member with two planar, parallel, flat surfaces, the present invention is also applicable to solid oxide fuel cell modules where the solid oxide fuel cells are supported by the anode electrodes or where the solid oxide fuel cells are supported by the electrolyte(s).

Although the present invention has been described with reference to solid oxide fuel cell modules with solid oxide fuel cells arranged on a hollow porous support member with two planar, parallel, flat surfaces, the present invention is also applicable to hollow tubular solid oxide fuel cell modules with solid oxide fuel cells arranged with the anode electrodes within the cathode electrodes and the fuel supplied into the hollow tubular solid oxide fuel cell modules. The tubular solid oxide fuel cells may be supported by a hollow porous tubular member radially within the anode electrodes, the solid oxide fuel cells may be supported by the anode electrodes or the solid oxide fuel cells may be supported by the electrolyte(s).

The presence of a fuel cell arrangement with recirculation of the unused oxidant from the cathode electrodes back to the cathode electrodes together with fresh oxidant from the space between the inner vessel and the outer vessel provides a greater compression load on the inner vessel. The recirculation of the unused oxidant from the cathode electrodes back to the cathode electrodes is provided by the fresh oxidant, which is at a higher pressure in the space between the inner vessel and the outer pressure vessel because it is delivered from a compressor. The recirculation of the unused oxidant from the cathode electrodes back to the cathode electrodes takes place entirely within the inner vessel. There is also a combustor within the recirculation path for the unused oxidant to burn unused fuel in a portion of the unused oxidant. The unused oxidant from the solid oxide fuel cells is collected within the inner vessel and a portion of the unused oxidant is supplied to the turbine to drive the compressor and a portion of the unused oxidant is recirculated back to the cathode electrodes of the solid oxide fuel cells. A pressure difference across the inner vessel ensures that, in the case of a leak path through the inner vessel, there is a flow of cold fresh oxidant from the space between the inner vessel and the outer pressure vessel to the space within the inner vessel to enhance the inherent safety of the arrangement.

The recirculation of the unused oxidant may be achieved using a blower, or other suitable device as previously mentioned, but there would be a lower pressure difference between the space within the inner vessel and the space between the inner vessel and the outer pressure vessel.

Although the present invention has been described with reference to solid oxide fuel cells, the present invention is equally applicable to molten carbonate fuel cells or other types of fuel cells operating at high temperatures, e.g. more than 300° C.

The invention claimed is:

1. A fuel cell arrangement comprising;
   at least one fuel cell module, each fuel cell module comprising a plurality of fuel cells, each fuel cell comprising an anode electrode, a cathode electrode and an electrolyte, the at least one fuel cell module being hollow, defining at least one chamber, and being arranged within at least one inner vessel, the at least one inner vessel being arranged within an outer pressure vessel;
   means to supply oxidant to the cathode electrodes, and means to supply fuel to the anode electrodes,
   wherein:
      the means to supply oxidant is arranged to supply oxidant to the space within the inner vessel;
      the space within the inner vessel is arranged to supply oxidant to the cathode electrodes;
      the means to supply fuel is arranged to supply fuel to the at least one chamber in the at least one fuel cell module; and
      the at least one chamber in the at least one fuel cell module is arranged to supply fuel to the anode electrodes of the at least one fuel cell module.

2. A fuel cell arrangement as claimed in claim 1, wherein the means to supply oxidant to the cathode electrodes is arranged such that the pressure between the outer pressure vessel and the at least one inner vessel is greater than the pressure in the at least one inner vessel such that the at least one inner vessel is subjected to a compressive load.

3. A fuel cell arrangement as claimed in claim 1, further comprising means to remove exhaust gases from the fuel cells.

4. A fuel cell arrangement as claimed in claim 1, wherein the means to supply oxidant supplies oxidant into a space between the at least one inner vessel and the outer pressure vessel.

5. A fuel cell arrangement as claimed in claim 4, wherein the means to supply oxidant supplies the oxidant from the space between the at least one inner vessel and the outer pressure vessel into the at least one inner vessel.

6. A fuel cell arrangement as claimed in claim 5, wherein the means to supply oxidant supplies the oxidant from the space between the at least one inner vessel and the outer pressure vessel to a space between the inner vessel and the at least one fuel cell module.

7. A fuel cell arrangement as claimed in claim 5, wherein the means to supply oxidant supplies the oxidant from the space between the at least one inner vessel and the outer pressure vessel into the at least one inner vessel through at least one ejector, pump, fan, blower or turbomachine.

8. A fuel cell arrangement as claimed in claim 4, wherein the means to supply oxidant supplies a first portion of the oxidant through at least one restrictor to the space between the at least one inner vessel and the outer pressure vessel, and the means to supply oxidant supplies a second portion of the oxidant into the at least one inner vessel.

9. A fuel cell arrangement as claimed in claim 8, wherein the means to supply oxidant supplies the second portion of the oxidant into the space between the inner vessel and the at least one fuel cell module.

10. A fuel cell arrangement as claimed in claim 8, wherein the means to supply oxidant supplies the second portion of the oxidant into the at least one inner vessel through at least one ejector, pump, fan, blower or turbomachine.

11. A fuel cell arrangement as claimed in claim 8, wherein the means to supply oxidant supplies the first portion of oxidant from the space between the outer pressure vessel and the at least one inner vessel into the at least one inner vessel through at least one restrictor.

12. A fuel cell arrangement as claimed in claim 11, wherein the means to supply oxidant supplies the first portion of oxidant from the space between the outer pressure vessel and the at least one inner vessel into the at least one inner vessel through the at least one restrictor and the at least one ejector, pump, fan, blower or turbomachine.

13. A fuel cell arrangement as claimed in claim 5, further comprising means to supply unused oxidant to a space between the at least one inner vessel and the at least one fuel cell module.

14. A fuel cell arrangement as claimed in claim 13, wherein the means to supply unused oxidant to the space between the at least one inner vessel and the at least one fuel cell module comprises the at least one ejector, pump, fan, blower or turbomachine.

15. A fuel cell arrangement as claimed in claim 14, wherein the means to supply unused oxidant to the space between the at least one inner vessel and the at least one fuel cell module comprises:
   at least one combustor;
   means to supply unused oxidant to the at least one combustor; and
   means to supply unused fuel to the at least one combustor; and
   means to supply the products of the at least one combustor to the at least one ejector, pump, fan, blower or turbomachine.

16. A fuel cell arrangement as claimed in claim 1, wherein the at least one inner vessel is tubular and the outer pressure vessel is tubular.

17. A fuel cell arrangement as claimed in claim 1,
   further comprising insulation provided on an inner surface of the at least one inner vessel.

18. A fuel cell arrangement as claimed in claim 17,
   further comprising a space provided between the insulation and the inner surface of the at least one inner vessel.

19. A fuel cell arrangement as claimed in claim 1, further comprising insulation provided on an outer surface of the at least one inner vessel.

20. A fuel cell arrangement as claimed in claim 19, further comprising a space provided between the insulation and the outer surface of the at least one inner vessel.

21. A fuel cell arrangement as claimed in claim 1, further comprising insulation provided on an outer surface of the outer pressure vessel.

22. A fuel cell arrangement as claimed in claim 1, wherein a plurality of modules are arranged within the at least one inner vessel.

23. A fuel cell arrangement as claimed in claim 1, wherein there is a plurality of inner vessels.

24. A fuel cell arrangement as claimed in claim 1, wherein there is a single inner vessel.

25. A fuel cell arrangement as claimed in claim 23, wherein a plurality of modules are arranged within each inner vessel.

26. A fuel cell arrangement as claimed in claim 24, wherein the modules are arranged around central axis.

27. A fuel cell arrangement as claimed in claim 1, wherein the means to supply oxidant comprises a pump or a compressor.

28. A fuel cell arrangement as claimed in claim 27, wherein the compressor is connected to a turbine.

29. A fuel cell arrangement as claimed in claim 28, wherein a portion of an unused oxidant is supplied to the turbine to drive the turbine.

30. A fuel cell arrangement comprising:
at least one fuel cell module, each fuel cell module comprising a plurality of fuel cells, each fuel cell comprising an anode electrode, a cathode electrode and an electrolyte, the at least one fuel cell module being hollow, defining at least one chamber, and being arranged within at least one inner vessel, the at least one inner vessel being arranged within an outer pressure vessel;
means to supply oxidant to the cathode electrodes, and
means to supply fuel to the anode electrodes,
wherein:
the means to supply oxidant is arranged to supply oxidant to a space within the inner vessel;
the space within the inner vessel is arranged to supply oxidant to the cathode electrodes;
the means to supply fuel is arranged to supply fuel to the at least one chamber in the at least one fuel cell module;
the at least one chamber in the at least one fuel cell module is arranged to supply fuel to the anode electrodes of the at least one fuel cell module;
a first pressure sensor is arranged to measure the pressure in a space between the at least one inner vessel and the outer pressure vessel;
a second pressure sensor is arranged to measure the pressure in a space between the at least one inner vessel and the at least one fuel cell module; and
a monitor is arranged to compare the pressure measured by the first pressure sensor and the pressure measured by the second pressure sensor to determine if there is an overpressure due to component malfunction or burning of fuel in the fuel cell module.

31. A fuel cell arrangement as claimed in claim 7, wherein:
the at least one ejector, pump, fan, blower or turbomachine is arranged such that it extends radially with respect to the axes of the at least one inner vessel;
the inlet of the at least one ejector, pump, fan, blower or turbomachine is arranged at the radially inner end; and
the exhaust of the at least one ejector, pump, fan, blower or turbomachine is arranged at the radially outer end.

32. A fuel cell arrangement as claimed in claim 4, wherein the at least one inner vessel defines a space with a wall member secured to the at least one inner vessel, and the means to supply oxidant supplies oxidant into the space between the at least one inner vessel and the wall member.

33. A fuel cell arrangement as claimed in claim 32, wherein the means to supply oxidant supplies oxidant from the space between the at least one inner vessel and the wall member to the space within the at least one inner vessel.

34. A fuel cell arrangement as claimed in claim 33, wherein the means to supply oxidant supplies the oxidant from the space between the at least one inner vessel and the wall member to the space within the at least one inner vessel through the at least one ejector, pump, fan, blower or turbomachine.

35. A fuel cell arrangement as claimed in claim 32, wherein the means to supply oxidant supplies oxidant from the space between the at least one inner vessel and the wall member to the space between the at least one inner vessel and the outer pressure vessel.

36. A fuel cell arrangement as claimed in claim 7, wherein:
the at least one ejector, pump, fan, blower, or turbomachine is arranged such that it extends axially with respect to the axes of the of at least one inner vessel;
the inlet of the at least one ejector, pump, fan, blower or turbomachine is arranged at one axial end of the inner vessel; and
the exhaust of the at least one ejector, pump, fan, blower or turbomachine is arranged at a central region of the inner vessel.

37. A fuel cell arrangement as claimed in claim 2, wherein the means to supply oxidant to the space within the at least one inner vessel supplies the oxidant through at least one ejector, pump, fan, blower or turbomachine to a space between the at least one inner vessel and the at least one fuel cell module.

38. A fuel cell arrangement as claimed in claim 37, wherein the at least one ejector, pump, fan, blower or turbomachine supplies unused oxidant from the at least one fuel cell module to the space between the at least one inner vessel and the at least one fuel cell module.

39. A fuel cell arrangement as claimed in claim 38, further comprising:
means to supply unused oxidant from the at least one fuel cell module to at least one combustor;
means to supply unused fuel from the at least one fuel cell module to the at least one combustor; and
means to supply the products of the at least one combustor to the at least one ejector, pump, fan, blower or turbomachine.

40. A fuel cell arrangement as claimed in claim 1, wherein the inner vessel further comprises a plurality of devices, which allow radial expansion and contraction of at least one end of the at least one inner vessel.

41. A fuel cell arrangement as claimed in claim 40, wherein the devices are arranged on both ends of the at least one inner vessel.

42. A fuel cell arrangement comprising:
at least one fuel cell module, each fuel cell module comprising a plurality of fuel cells, each fuel cell comprising an anode electrode, a cathode electrode and an electrolyte, the at least one fuel cell module being hollow, defining at least one chamber, and being arranged within at least one inner vessel, the at least one inner vessel being arranged within an outer pressure vessel;
means to supply oxidant to the cathode electrodes, and
means to supply fuel to the anode electrodes,
wherein:
the means to supply oxidant is arranged to supply oxidant to a space within the inner vessel;
the space within the inner vessel is arranged to supply oxidant to the cathode electrodes;
the means to supply fuel is arranged to supply fuel to the at least one chamber in the at least one fuel cell module;
the at least one chamber in the at least one fuel cell module is arranged to supply fuel to the anode electrodes of the at least one fuel cell module; and the inner vessel further comprises a plurality of devices, which allow radial expansion and contraction of at least one end of the at least one inner vessel, each device comprises a corrugated elongate member having longitudinally spaced apart troughs and longitudinally spaced apart peaks;

the corrugated elongate member is secured at its longitudinally spaced troughs to the at least one end of the at least one inner vessel;

the corrugated elongate member is secured at its longitudinally spaced peaks to an elongate member;

the elongate member is U-shaped in cross-section; and the corrugated elongate member is secured to the elongate member to the surface between the limbs of the U-shaped elongate member.

43. A fuel cell arrangement as claimed in claim 42, wherein each device extends radially relative to the axis of the at least one inner vessel and the devices are angularly spaced apart on the at least one end of the at least one inner vessel.

44. A fuel cell arrangement as claimed in claim 1, wherein the fuel cells are solid oxide fuel cells.

45. A fuel cell arrangement comprising:

at least one fuel cell module, each fuel cell module comprising a plurality of fuel cells, each fuel cell comprising an anode electrode, a cathode electrode and an electrolyte, the at least one fuel cell module being hollow and defining at least one chamber, and being arranged within at least one inner vessel, the at least one inner vessel being arranged within an outer pressure vessel;

means to supply oxidant to the cathode electrodes, wherein:

the means to supply oxidant is arranged to supply oxidant into a space between the at least one inner vessel and the outer pressure vessel;

the means to supply oxidant is arranged to supply oxidant to the space within the inner vessel;

the space within the inner vessel is arranged to supply oxidant to the cathode electrodes, and the means to supply oxidant to the cathode electrodes is arranged such that the pressure in the space between the outer pressure vessel and the at least one inner vessel is greater than the pressure in the at least one inner vessel such that the at least one inner vessel is subjected to a compressive load;

means to supply fuel to the anode electrodes, wherein:

the means to supply fuel is arranged to supply fuel to the at least one chamber in the at least one fuel cell module; and the at least one chamber in the at least one fuel cell module is arranged to supply fuel to the anode electrodes of the at least one fuel cell module; and means to re-circulate unused oxidant from the cathode electrodes back to the cathode electrodes.

46. A fuel cell arrangement as claimed in claim 45, wherein the means to re-circulate unused oxidant from the cathode electrodes back to the cathode electrodes comprises at least one ejector, pump, fan, blower or turbomachine.

* * * * *